Figure 1:
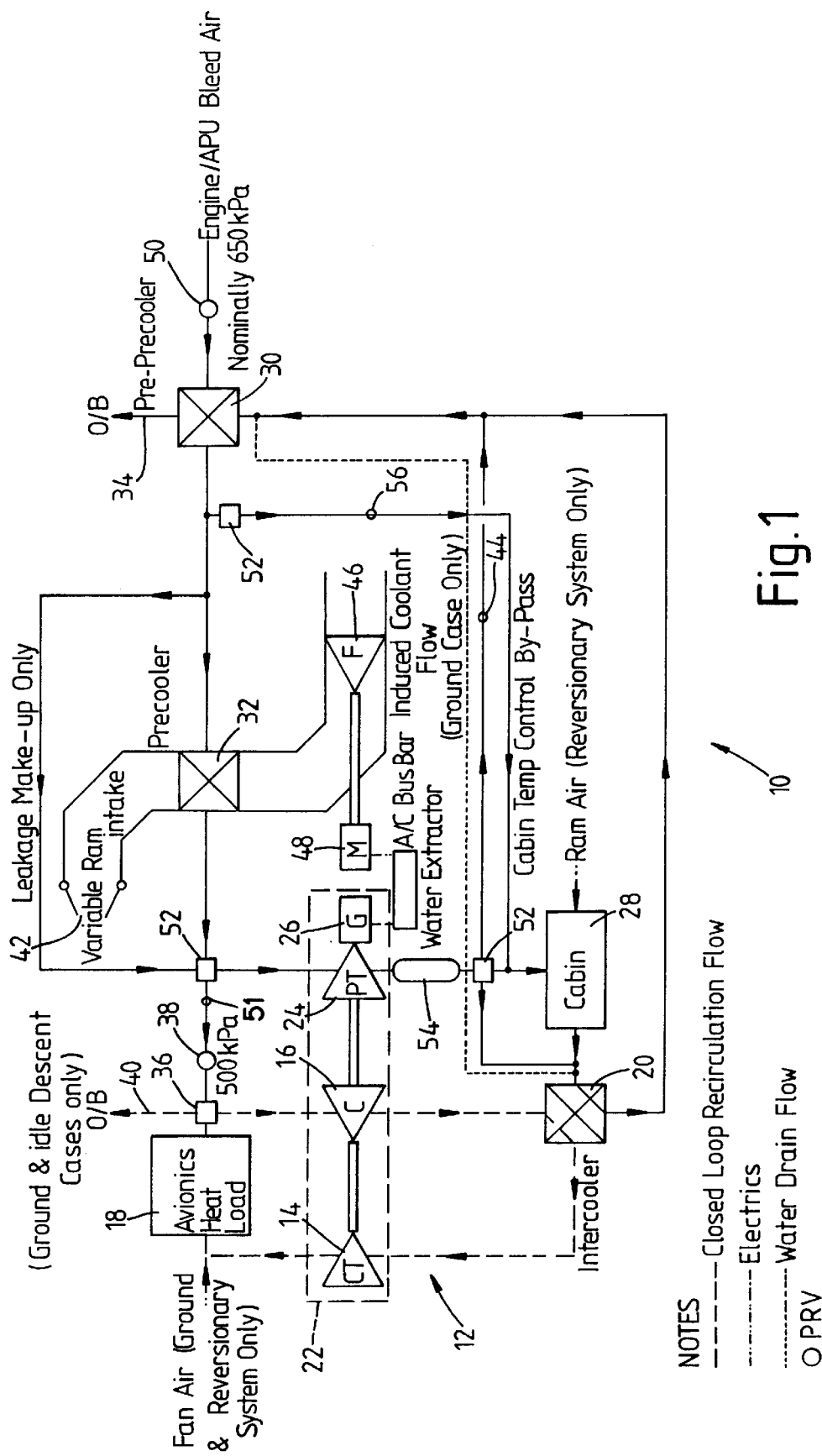

United States Patent [19]
Coleman et al.

[11] Patent Number: 5,860,283
[45] Date of Patent: Jan. 19, 1999

[54] ENVIRONMENTAL CONTROL SYSTEM

[75] Inventors: Andrew D. Coleman; Stephen J. R. Smith, both of Preston, United Kingdom

[73] Assignee: British Aerospace Public Limited Company, Farnborough, England

[21] Appl. No.: 633,999

[22] Filed: Apr. 19, 1996

[30]   Foreign Application Priority Data

Apr. 20, 1995 [GB]   United Kingdom ............... 9508043

[51] Int. Cl.⁶ ............................. F25B 9/00; F25D 9/00
[52] U.S. Cl. ................................. 62/87; 62/402
[58] Field of Search .................. 62/401, 402, 241, 62/239, 236, 172, 86, 87, 61

[56]   References Cited

U.S. PATENT DOCUMENTS

| | | | |
|---|---|---|---|
| 4,207,754 | 6/1980 | Chaboseau et al. | 62/402 |
| 4,295,518 | 10/1981 | Rannenberg | 165/2 |
| 4,934,154 | 6/1990 | Altoz et al. | 62/87 |
| 4,967,565 | 11/1990 | Thomson et al. | 62/87 |
| 5,086,622 | 2/1992 | Warner | 62/88 |
| 5,121,610 | 6/1992 | Atkinson et al. | 62/151 |
| 5,201,182 | 4/1993 | Grignon et al. | 62/3.2 |
| 5,309,724 | 5/1994 | Schreiber et al. | 62/87 |

FOREIGN PATENT DOCUMENTS

| | | |
|---|---|---|
| 248578 | 12/1987 | European Pat. Off. . |
| 456549 | 11/1991 | European Pat. Off. . |
| 711120 | 6/1954 | United Kingdom . |
| 759109 | 5/1958 | United Kingdom . |
| 2237372 | 5/1991 | United Kingdom . |

*Primary Examiner*—William Doerrler
*Attorney, Agent, or Firm*—Pillsbury Madison & Sutro LLP

[57]   ABSTRACT

An environment control system which comprises: a cooling turbine drivingly connected to a compressor, means for driving said cooling turbine-compressor combination, and intercooler means, wherein, in a first mode of operation, the working fluid circulates around a closed loop from the compressor to the intercooler to the cooling turbine, thence along a cooling pass to cool equipment or a volume, and back to the compressor inlet, said system including means operable in a second mode of operation to interrupt said loop to cause working fluid to vent to ambient during or after said cooling pass and to introduce further working fluid into said loop.

7 Claims, 1 Drawing Sheet

ENVIRONMENTAL CONTROL SYSTEM

This invention relates to environmental control systems and in particular, but not exclusively to such systems for use on board an aircraft.

The environmental control system (ECS) on board an aircraft is used to condition the cabin and crew as well as providing cooling for avionics and/or other equipment needing cooling.

Various systems have been proposed which generally take bleed air from the compressor of the aircraft engine or of an auxiliary power unit. In a typical closed loop ECS, working fluid passes around a closed loop between a compressor, an intercooler, a turbine driving the compressor and a heat exchanger which extracts heat from the equipment or volume to be cooled.

It should be noted that as a result of unavoidable cycle inefficiencies the compressor absorbs more energy than the cooling turbine can produce, therefore additional input power has to be provided to drive the compressor/cooling turbine. Without this additional input power the closed loop will not operate.

The closed loop system may be driven by many sources, eg a hydraulic motor, an electric motor or an air motor (power turbine). However, due to the need to provide an air supply to the closed loop, the high rotational speed of the compressor cooling turbine and the relatively high powers required, the most suitable drive method is an air motor (power turbine). This also has the advantage of having the same common source of working fluid as the closed loop.

One problem with using an air motor (power turbine) is that although the closed loop system will operate when there is sufficient source pressure for the air motor (power turbine) to provide the necessary power required, when the source pressure is relatively low, for example when the aircraft is on the ground or in flight, when engine idle or low power settings are selected, insufficient power will be produced by the air motor (power turbing) to drive the compressor/cooling turbine, and therefore the closed loop will not function.

To minimize the power input required by the closed loop it is essential to reduce the compressor pressure rise to a minimum whilst still ensuring the expansion available for the cooling turbine ensures acceptable cooling turbine outlet temperatures. In a conventional closed loop ECS relatively high compressor pressure ratios are required since the cooling turbine inlet temperatures are high due to utilizing ram air as the intercooler coolant; it should be noted that, at high speed flight conditions, the ram air will be hot due to the stagnation recovery effects. An alternative coolant is fuel, but fuel temperatures too can rise to relatively high levels on small to medium-sized military aircraft, especially in warm ambient conditions.

Due to the previously mentioned points, typical conventional closed loop ECS have relatively high input power requirements which result in systems with a low coefficient of performance. However, these are still higher than open air cycle ECS.

Accordingly in one aspect, this invention provides an environment control system which comprises;
 a cooling turbine drivingly connected to a compressor, means for driving said cooling turbine-compressor combination, and intercooler means,
wherein, in a first mode of operation, the working fluid circulates around a closed loop train the compressor to the intercooler to the cooling turbine, thence along a cooling pass to cool equipment or a volume, and back to the compressor inlet, said system including means operable in a second mode of operation to interrupt said loop to cause working fluid to vent to ambient during or after said cooling pass and to introduce further working fluid into said loop.

By this dual mode arrangement, there is a normal operating mode, in which the closed loop cooling-turbine compressor combination is driven by a power source, and a switchable alternative mode, for when the power deliverable by said power source is insufficient, where the loop is opened and the cooling-turbine compressor combination functions as an open loop system, with the working fluid venting to ambient and being replaced by fresh fluid supplied to the compressor.

This may be achieved in a variety of ways. Where the ECS is on board an aircraft incorporating a gas turbine engine, the means for driving tho ECS cooling turbine-compressor combination may comprise a power turbine driven by air bled from the gas turbine engine compressor or by air bled from an auxiliary power unit compressor. In the second, open loop, mode the further supply of working fluid may comprise air bled from the engine or from the auxiliary power unit.

In a particularly preferred aspect, at least some of the bleed air exhausted from said power turbine is used to cool a volume or equipment, for example to provide cabin conditioning. Any excess, together with discharge air downstream of said volume or equipment is preferably used as coolant for said intercooler. The requirement for comfortable cabin temperatures across a whole range of aircraft operating conditions means that the cabin discharge air temperature tends to be quite consistent at a favorable level, and considerably lower than the typical high speed flight ram air temperatures or fuel temperatures in the later parts of flights in high ambient temperatures, which are used in some conventional close loop systems. This allows for a lower pressure rise across the compressor, therefore minimizing the input power required by the closed loop whilst maintaining low cooling turbine outlet temperatures, (achieved by low expansion ratio with low cooling turbine inlet temperatures).

In another aspect of this invention, there is provided an environmental control system for an aircraft incorporating a gas turbine engine, said system comprising:
 an ECS cooling turbine drivingly connected to an ECS compressor,
 a power turbine for driving said ECS cooling turbine-compressor combination, and
 intercooler means,
wherein working fluid in use circulates around a closed loop including said ECS compressor, said intercooler, said ECS cooling turbine and a cooling pass, and said power turbine is driven by air bled from the compressor of said gas-turbine engine, and the discharge air from said power turbine is used, optionally after cooling a further volume or equipment, as coolant for said intercooler.

While the invention has been described above, it extends to any inventive combination of features set out above or in the following description.

The invention may be performed in various ways, and an embodiment thereof will now be described by way of example only, reference being made to the accompanying drawing, which is a schematic diagram of an embodiment of aircraft environmental control system in accordance with this invention.

The illustrated embodiment is intended for use on a high performance military aircraft to provide cabin and crew and avionic/equipment conditioning, and implements a dual mode closed loop air cycle scheme. The basic features of this particular embodiment will first be described, followed by a brief description of its operation.

Basic Closed Loop and Power Turbine

Referring to FIG. 1, the heart of the ESC system 10 is a closed loop 12 linking the cooling turbine 14, the compressor 16, the avionics load 18 and the intercooler 20. The cooling turbine 14 provides cold conditioning air to cool the avionics load 18, and tho compressor 16 raises the loop air pressure and temperature so that the heat extracted from the avionics load 18 plus the net power due to the compressor 16 can he affectively removed from the loop air in the intercooler 20. The avionics load 18 may be conditioned by a variety of methods, such as cold wash, where conditioned air flows over or through the avionics equipment, or via load heat exchangers with either air or liquid as the avionic cooling fluid, or a combination of these methods may also be employed.

As a result of unavoidable cycle inefficiencies, the compressor 16 requires a greater drive power than is obtained from the cooling air expansion in the cooling turbine 14. Additional input power is therefore required to drive the cooling turbine/compressor "cold air unit" 22 and, in the present embodiment, this is provided by a power turbine 24 driver by engine bleed air from the compressor of the aircraft engine (not shown). The cooling turbine-compressor combination could be driven by a different prime-mover but a power turbine is preferred where there is a ready supply of blood air.

The closed loop 12 may incorporate water extraction if condensation is found to be a problem.

Electrical Generator

Because of the wide range of aircraft operating conditions and associated bleed air temperatures and pressures, during normal operation the power turbine 24 will always give more power than is needed to drive the compressor 16 of the cold air unit 22; the excess power is used to produce electrical power in a generator 26, which may be integral to the cold air unit 22. The electrical power produced may be fed into the aircraft distribution system to reduce the load on the main shaft-driven generators, reducing engine shaft power offtake.

Cabin Conditioning/Regenerative Cooling

To enhance overall efficiency, the exhaust air from the power turbine 24 is well suited to providing conditioning and pressurization for the aircraft cabin 28, and then to remove the closed loop heat in the intercooler 20 and, finally, to cool the engine bleed air in a pre-precooler 30. The engine bleed flow is therefore ultimately discharged overboard at 34 at a relatively high temperature, which indicates that it is being used to provide conditioning in a very efficient way.

Dual Mode for Low Supply Pressure Cases

The illustrated embodiment has an additional dual mode feature which overcomes one of the main disadvantages of the bleed air driven closed loop air cycle ECS, namely the need for a relatively high power turbine inlet pressure in order to drive the basic closed loop. During ground operation and flight idle descent the system has to be capable of functioning with relatively low pressure auxiliary power unit, or engine bleed, air supplies. In conventional bleed air driven closed loop ECS, this has been viewed as a disadvantage. The present embodiment provides system operation in these low bleed pressure cases by breaking by means of a valve 36, the closed loop 12 downstream of the avionics load 18. In closed loop operation, the valve 36 is in its normal made position and passes the air discharged from the avionics load 18 back to the compressor 16, and also allows engine/APU blood air from a pressure regulating valve 38 to enter the closed loop to take up for any leakages.

When the valve 36 is moved to its second node position, loop air discharged from the avionics heat load 18 is exhausted to atmosphere at 40, and engine/APU bleed air is fed into the loop from the pressure regulating valve 38. Thus, when the valve is in Its second mode position, the loop operates as an open loop with the cooling turbine-compressor combination 14/16 running in parallel with the power turbine 24. Although this involves drawing a greater bleed air massflow than would be the case if closed loop operation were possible in the ground and flight idle descent cases, the system will provide typically about two thirds of full cooling capacity in these cases which is a vast improvement compared to conventional open cycle ECS.

Intercooler Coolant

Our analysis of the basic closed loop showed that, for high performance aircraft, a cooler and less variable source of intercooler coolant than ram air or fuel is required in order to keep the net input power to the closed loop down to reasonable levels. Accordingly, in the present embodiment the use of a bleed air power turbine 24 to drive the closed loop 12, whilst simultaneously producing a supply of cold air suitable for both cabin conditioning and providing intercooler coolant, provides considerable advantages.

Pre-Precooler Heat Exchanger and Precooler

The system design incorporates regenerative use of exhaust air to give appreciable initial cooling of engine bleed air, in order to reduce significantly the precooler ram flow required from the variable area intake scoop 42.

Cabin Temperature and Airflow Control

The illustrated embodiment controls cabin mean temperature whilst keeping cabin airflow within a reasonable range. A power turbine air dump line 44 passes excess air, not wanted for either cabin 28 or intercooler 20, to the pre-precooler 30.

Pressure Regulating Valves (PRVs)

A pressure regulating valve 50 has been placed at the system inlet to reduce the pressure supplied from the engine/APU to the system. The control pressure is selected to give the required system performance but may be increased if required to give greater expansion in the power turbine 24. The pressure regulating valve 38 located in the closed loop top-up line 51 is set to give the desired performance but could be increased if required to put closed loop massflow up to increase cooling capacity, although this would result in higher input powers. In general, the pressure regulating valves 38 and 50 may be set at higher, lower or variable pressure to alter the performance of the system, for example to make the system run to provide sub-zero exit temperatures from the power turbine 24 and cooling turbine 14.

Avoidance or Variable Turbine Nozzle Areas

Both the closed loop cooling turbine 14 and the power turbine 24 have fixed nozzle areas in the present embodiment. There is inevitably some compromise across the wide range of operating cases but this is considered an acceptable alternative to the mechanical complexity associated with variable nozzles. However, we have found that regenerative use of almost all conditioning bleed airflow offsets any slight power turbine flow excesses. The dual node system operation in conjunction with the use of a device to absorb excess power, ie generator, negates the use of variable nozzles.

The embodiment may be modified in many ways, according to the intended application. Water extraction may be incorporated for the closed loop air. The electrical generator 26 effectively serves as a means of using the excess energy delivered by the power turbine 24, but the generator may be supplemented or replaced by a brake fan, a hydraulic pump or a combination of these features.

The relative positions of the cabin 28 and the avionics heat load 18 may be interchanged, with suitable adjustments to working pressures and airflows. Likewise, a portion of the avionics heat load 18 may be cooled by discharge air from the power turbine 24, as opposed to discharge air from the closed loop cooling turbine 14.

Operation of the System

Engine/APU bleed air passes through the pre-precooler 30, where it Is cooled typically to around 150°/200° C., and thence to the precooler 32, where it is cooled to around 90°/120° C. by the ambient air via the ram intake 42, and then passes to a flow control valve 52. The bleed air then enters the power turbine 24, where it does work and exits at around 3°/6° C. and enters a water extractor 54. From there the air passes via a flow control valve 52 into cabin 28 to condition it. From the cabin 28, the air enters the intercooler 20 where it cools the closed loop air, and then is fed to the pre-precooler 30 regeneratively to cool the bleed air entering the system and then is discharged outboard at 34.

In the closed loop 12, during closed loop operation, bleed air circulates around the closed loop defined by the compressor 16, the intercooler 20, the cooling turbine 14 and the avionics heat load 18. The loop pressures are set by the pressure regulating valve 38, which allows leakage make-up air to enter the closed loop circuit.

In open loop mode, the valve 36 is operated so that loop fluid exiting the avionics heat load 18 is exhausted outboard at 40, whilst fresh bleed air is fed to the inlet of compressor 16 via the pressure regulating valve 38.

In either mode, the cabin temperatures may be regulated by introducing a controllable amount of relatively warm air via line 56. Likewise the flow control valve 52 downstream of the water extractor 54 controls the relative proportions of air fed to the cabin 28, directly to the intercooler 20 and directly to the pre-precooler 30. Water from the water extractor 54 ray be sprayed into the intercooler 20 and/or the pre-precooler 30 to provide evaporative cooling within the heat exchangers, resulting in higher temperature drop of the charge (hot) fluid.

Aircraft/System Operation Modes

Hangar Maintenance

The ECS will be inoperative since neither the auxiliary power unit or aircraft engine/s are permitted to be operated in a hangar environment. No cockpit conditioning will be provided but avionic cooling will be performed via fans drawing in ambient air.

Ground Standby

The System adopts an open loop configuration since there is insufficient engine/APU pressure to power the closed loop system via the power turbine.

In this mode the system will provide typically ⅔rds maximum system cooling capacity. The cockpit/crew will receive a cooling airflow, whilst the avionics cooling may be provided by system air, fan air (from ambient) or a combination of these option. Precooler coolant air will be induced by fan 46 driven by motor 48.

Flight

Once the engine/s pressure is sufficiently high to power the closed loop via the power turbine, closed loop system operation will commence, providing avionic/equipment cooling. The cockpit/crew conditioning will be by power turbine discharge air.

Flight Reversionary (ECS Failed)

Cockpit/crew conditioning will be via ram air, while avionics will be cooled by fan air drawn in from ambient. In this mode the aircraft will have a reduced flight envelope.

We claim:

1. An environmental control system for cooling a load, said load having associated therewith a gas turbine engine, said environmental control system defining a generally closed loop circuit for working fluid and comprising:
   a compressor for compressing said working fluid;
   intercooler means having a hot pass side for extracting heat from said compressed working fluid and a cold pass side for coolant;
   a cooling turbine drivingly connected to said compressor and for extracting rotational energy from said working fluid thereby to cool it;
   means for delivering said cooled working fluid to said load thereby to extract heat therefrom;
   means for returning said working fluid to said compressor;
   a power turbine drivingly connected to said compressor, and
   means for delivering bleed fluid from said gas turbine engine to drive said power turbine,
   said system further including working fluid management means operable in an open loop mode of operation to discharge working fluid from said circuit adjacent or after said load, and to introduce into said circuit bleed fluid from said gas turbine engine to replace at least partially said discharged working fluid,
   said system further including means for delivering bleed fluid from downstream of said power turbine to the cold pass side of said intercooler means.

2. An environmental control system for cooling a load, said load having associated therewith a gas turbine engine, said environmental control system defining a generally closed loop circuit for working fluid and comprising:
   a compressor for compressing said working fluid;
   intercooler means having a hot pass side for extracting heat from said compressed working fluid and a cold pass side for coolant;
   a cooling turbine drivingly connected to said compressor and for extracting rotational energy from said working fluid thereby to cool it;
   means for delivering said cooled working fluid to said load thereby to extract heat therefrom;
   means for returning said working fluid to said compressor;
   a power turbine drivingly connected to said compressor, and
   means for delivering bleed fluid from said gas turbine engine to drive said power turbine,
   said system further including working fluid management means operable in an open loop mode of operation to discharge working fluid from said circuit adjacent or after said load, and to introduce into said circuit bleed fluid from said gas turbine engine to replace at least partially said discharged working fluid,
   including means for delivering working fluid from downstream of said power turbine to cool a further load.

3. An environmental control system for cooling a load, said load having associated therewith a gas turbine engine, said environmental control system defining a generally closed loop circuit for working fluid and comprising:
   a compressor for compressing said working fluid;
   intercooler means having a hot pass side for extracting heat from said compressed working fluid and a cold pass side for coolant;

a cooling turbine drivingly connected to said compressor and for extracting rotational energy from said working fluid thereby to cool it;

means for delivering said cooled working fluid to said load thereby to extract heat therefrom;

means for returning said working fluid to said compressor;

a power turbine drivingly connected to said compressor, and means for delivering bleed fluid from said gas turbine engine to drive said power turbine, said system further including working fluid management means operable in an open loop mode of operation to discharge working fluid from said circuit adjacent or after said load, and to introduce into said circuit bleed fluid from said gas turbine engine to replace at least partially said discharged working fluid, including pre-cooler means for cooling said bleed fluid prior to supply to said power turbine.

4. An environmental control system according to claim 3, including electricity generating means drivingly coupled to said power turbine.

5. An environmental control system according to claim 3, including ram air duct means for supplying ram air in use to the cold side of said pre-cooler means.

6. An environmental control system according to claim 3, including pre-pre-cooler means for cooling said bleed fluid prior to supply to said power turbine and means for passing bleed fluid from downstream of said intercooler means to the cold pass of said pre-pre-cooler means.

7. An environmental control system for cooling a load, said load having associated therewith a gas turbine engine, said environmental control system defining a generally closed loop circuit for working fluid and comprising:

a compressor for compressing said working fluid;

intercooler means having a hot pass side for extracting heat from said compressed working fluid and a cold pass side for coolant;

a cooling turbine drivingly connected to said compressor and for extracting rotational energy from said working fluid thereby to cool it;

means for delivering said cooled working fluid to said load thereby to extract heat therefrom;

means for returning said working fluid to said compressor;

a power turbine drivingly connected to said compressor, and means for delivering bleed fluid from said gas turbine engine to drive said power turbine, said system further including means for delivering bleed fluid from downstream of said power turbine to the cold pass side of said intercooler means.

* * * * *